UNITED STATES PATENT OFFICE.

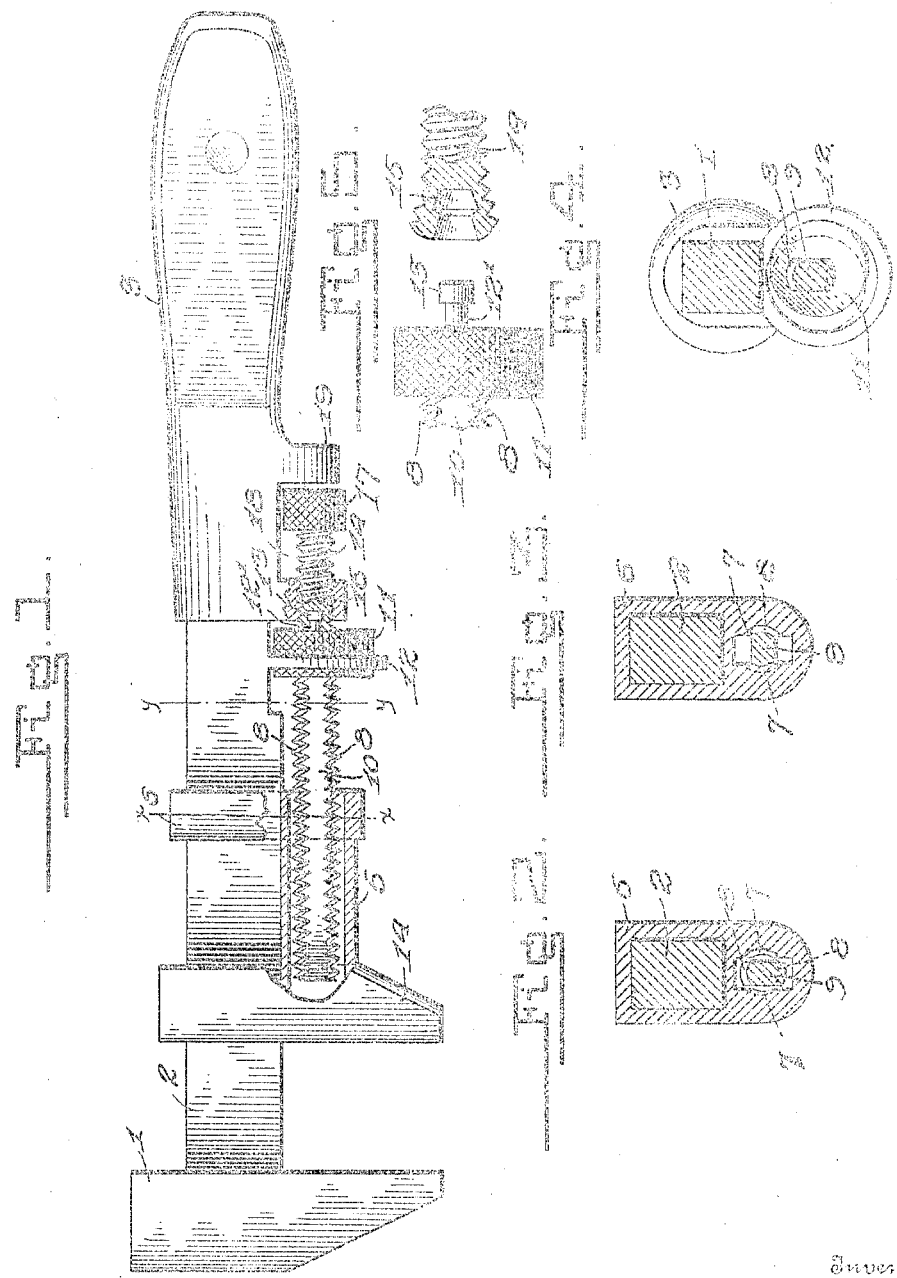

BRADFORD A. THOMAS, OF SAN FRANCISCO, CALIFORNIA.

MONKEY-WRENCH.

1,009,938.  Specification of Letters Patent.  Patented Nov. 28, 1911.

Application filed September 13, 1910. Serial No. 581,778.

*To all whom it may concern:*

Be it known that I, BRADFORD A. THOMAS, a citizen of the United States, residing at San Francisco, in the county of San Francisco and State of California, have invented certain new and useful Improvements in Monkey-Wrenches, of which the following is a specification, reference being had therein to the accompanying drawing.

This invention relates to wrenches, and has for its object to provide a new and improved wrench by means of which a movable fixed jaw may be rigidly tightened in place after it has been adjusted to clamped position.

The invention further has for its object to provide a new and improved wrench by means of which the adjusted part is securely locked in position.

Referring to the accompanying drawings:—Figure 1 is a view of a wrench with parts broken away and in section, constructed in accordance with this invention. Fig. 2 is a transverse sectional view thereof on the line $x$—$x$ of Fig. 1. Fig. 3 is a transverse sectional view showing the change of position of the screw stem. Fig. 4 is a cross section on the line $y$—$y$ of Fig. 1. Fig. 5 is a detail view of the connections of a portion of the operating mechanism.

(1) indicates a fixed jaw of the wrench mounted on the end of a bar or shank 2 provided with a handle 3.

(4) indicates the removable jaw which is slidably mounted on the shank 2 and which is formed with a tubular projection 5 parallel with the shank 2 and connected therewith by means of a sleeve or strap 6. Two sides of the socket of the tubular projection 5 are formed lengthwise with sections of a thread 7 with which are adapted to engage the sections 8 of the thread arranged opposite each other on two sides of a stem 9 which projects into the tubular projections 5. The stem 9 is formed on two opposite sides with flat faces 10 so that when the stem 9 is in the position shown in Fig. 2 and the teeth or sections of thread 8 are out of engagement with the sections of thread 7 the tubular projection 5 may be slid lengthwise on the stem 9. When the stem is turned to the position shown in Fig. 3 it is locked in engagement with the tubular projection 5 and holds the jaw 4 in adjusted position. The rear end of the stem 9 is provided with a thumb nut 11, said thumb nut being mounted eccentrically on the end of the stem 9 and being locked in a keeper 12 projecting over the shank 2. The thumb nut 11 is provided with a projection 12′ having a head 13 which is connected to one end of a threaded shank or stem 14 and is inclosed in a socket 15 in the end of the threaded shank 14,—said parts being connected together as shown by the flaring end of the threaded shank 14 which is clamped over the head 13 of a stem 12′. The stem 14 has its bearing in a projection 16 of the handle 3, and has at its outer end a milled thumb nut 17 which is located in a recess 18 in the handle formed between projection 16 and a projection 19 on the handle.

It will be seen that by means of this construction that the movable jaw 4 may be slid on the stem 9 to the position desired for clamping an object and then may be further advanced by turning the thumb nut 17, the end of the threaded shaft 14 bearing against the threaded end of the thumb nut 11 and advancing the stem 9 against the inner end of the tubular socket 5 thereby bearing against the object being clamped. After the jaw 4 is in clamping position, by turning the thumb nut 11 the threads or teeth 8 of the stem 9 will be moved into engagement with the section 7 and the tubular projection 5, and at the same time will be locked in place by the thumb nut 11 binding in the keeper 12 owing to its eccentric position on the stem 9.

Having described the invention, I claim:—

A wrench of the character described comprising a shank having a handle secured thereto, a fixed jaw on said shank, a movable jaw also on said shank and being provided with a tubular extension, said extension being internally threaded in sections, a rotatable stem threaded in sections adapted to engage with the threaded sections of said tubular extension, a circular keeper projecting from said shank, a thumb nut eccentrically mounted on said stem and in said keeper, a projection extending rearwardly from said thumb nut and being provided with an enlarged end, a pair of projections on said handle, and a threaded stem provided with a thumb nut at one end mounted between said projections, said stem being provided at the other end with a socket adapted for engagement with the enlarged end of the projection carried by said eccentric thumb nut.

In testimony whereof I hereunto affix my signature in presence of two witnesses.

BRADFORD A. THOMAS.

Witnesses:
F. R. MARSH,
WM. HASSHAGHEN.